United States Patent [19]
Williamson et al.

[11] Patent Number: 5,682,091
[45] Date of Patent: Oct. 28, 1997

[54] DIGITAL POWER OPTIMIZATION SYSTEM FOR POLYPHASE AC INDUCTION MOTORS

[75] Inventors: David L. Williamson; Ryan Corley, both of Austin, Tex.

[73] Assignee: National Power Systems, Inc., Miami, Fla.

[21] Appl. No.: 619,795

[22] Filed: Mar. 20, 1996

[51] Int. Cl.$^6$ .................................................. H02P 7/00
[52] U.S. Cl. ............................... 318/800; 318/806
[58] Field of Search .................... 318/798–815, 318/779, 787, 434, 439; 361/23, 29, 31

[56] References Cited

U.S. PATENT DOCUMENTS

| | | |
|---|---|---|
| 3,670,238 | 6/1972 | Ronk ............................ 321/55 |
| 4,052,648 | 10/1977 | Noks . |
| 4,088,935 | 5/1978 | D'Atre et al. . |
| 4,099,107 | 7/1978 | Eder . |
| 4,114,074 | 9/1978 | Stwart et al. ................ 318/257 |
| 4,158,225 | 6/1979 | Hertz ......................... 310/211 X |
| 4,176,307 | 11/1979 | Parker . |
| 4,190,793 | 2/1980 | Parker et al. . |
| 4,207,510 | 6/1980 | Woodbury . |
| 4,242,625 | 12/1980 | Hedges . |
| 4,243,927 | 1/1981 | D'Atre . |
| 4,276,505 | 6/1981 | Bose . |
| 4,281,276 | 7/1981 | Cutler et al. . |
| 4,297,628 | 10/1981 | Hedges ............................. 318/798 |
| 4,314,190 | 2/1982 | Walker et al. . |
| 4,382,223 | 5/1983 | Hedges . |
| 4,414,499 | 11/1983 | Hedges ............................. 318/806 |
| 4,450,398 | 5/1984 | Bose . |
| 4,636,702 | 1/1987 | Hedges . |
| 4,791,341 | 12/1988 | Brown et al. ..................... 318/809 |
| 4,864,212 | 9/1989 | Parker . |
| 5,068,560 | 11/1991 | Lundquist ........................ 310/125 |
| 5,481,171 | 1/1996 | Woginrich, Jr. .................. 318/798 |
| 5,592,062 | 1/1997 | Bach .............................. 318/809 |

*Primary Examiner*—Jonathan Wysocki
*Attorney, Agent, or Firm*—Herbert J. Hammond

[57] ABSTRACT

A method and apparatus for improving the efficiency of operation of polyphase AC induction motors. The method and apparatus utilizes a microprocessor to tune a motor control system such that time interval on at least two phases of a multi-phase power source such that the time intervals between turn-on of bi-directional switches and the time of sensing the resultant inrush currents of the two phases on two motor stators are maintained substantially constant as the load is varied.

12 Claims, 8 Drawing Sheets

FIG. 12

DIGITAL POWER OPTIMIZATION SYSTEM FOR POLYPHASE AC INDUCTION MOTORS

BACKGROUND OF THE INVENTION

Alternating current (AC) induction motors are designed for optimum efficiency operation at full rated load and specified voltage. Operating efficiency losses are due to the resistance of the windings through which the current flows or copper losses as well as hysteresis losses or iron losses, all resulting in the inherent inefficiency of the conversion of electric energy into magnetic field energy. The induction motor is inefficient when it is used at less than full load or at less than its minimum specified voltage or any combination of the two. The stator windings have the full voltage applied at all times irrespective of load with the result that both the resultant copper and iron losses are large even when the load is small. This results in excessive heating of the motor, shortened life and increased maintenance and operating costs. Increased heating causes a further increase of resistance, thus further decreasing efficiency.

One of the ways of reducing loses when operating an AC induction motor at less than full load is to reduce the applied voltage below its specified minimum. A known method used to accomplish this is to interrupt the AC power source for part of each half cycle. The motor under less than full load will continue to run at its normal speed due to its rotational momentum even when power is applied for less than a full half cycle period. A common device used to interrupt the AC power source is a bi-directional silicon controlled rectifier switch such as Triac installed in series with the stator windings. The Triac is turned on by an electrical signal for varying durations of the AC power cycle and can be switched in either direction. The effective applied voltage is thus reduced, which results in a reduction of stator current.

Although the adjustment of the stator current to match varying motor loads appears straightforward in theory, it is a difficult matter in practice, particularly when attempting to optimize the efficiency of a motor whose load is varying over time.

The usual approach is to sense the load on the motor and to cause a voltage or signal to be produced which varies with the load. The load sensitive signal is then used to vary the duration of each AC cycle that the Triac is turned on. In this manner, when the motor load is heavy, the signal will keep the Triac turned on for most of the AC cycle and more power will be delivered to the motor stator resulting in additional torque, while as the load decreases, the signal will be such as to reduce the duration of time the Triac is turned on and thus resulting in less power to the motor. Since there is no current to the stator during part of the low load AC cycle, heat and hysteresis losses are reduced, improving the overall efficiency of the motor.

Such methods for improving the operating efficiency of AC induction motors have been described in previous patents (e.g. Parker U.S. Pat. No. 4,864,212, Hedges U.S. Pat. No. 4,636,702, and Fisher U.S. Pat. No. 5,200,684).

The previous methods describe means for controlling the current flow through the motor to achieve improvements in either speed control or load control by measuring parameters such as the back electromotive force (EMF) or the phase lag between the voltage and current zero crossings.

These methods are designed for particular conditions of load and motor parameters and are not readily adaptable to continuously varying loads. The present invention is an improvement as it relates to apparatus and a method for automatically tuning the motor to obtain improved efficiency from polyphase AC induction motors under varying load and other operating conditions.

Improved efficiency is achieved then the stator current is equal to the rotor current under idealized conditions. All motor control systems are efforts to reach or achieve such a condition, or given certain external parameters, to approach such an operating state for most of the conditions of a motor.

Even motors that operate with steady-state loads have at least three different operating conditions. There is the initial startup, when inrush current can be very large; there is the period during the normal heating of the motor while it achieves its stabilized temperature; and finally, there is the steady-state operation. Designing or adjusting for optimum efficiency at any one condition compromises efficiency at other conditions. Furthermore, motors must be capable of operating in real environments where the input voltage usually varies (e.g., possibility of low or brown-out conditions as well as high voltages or voltage surges). Ambient temperatures may also vary over wide ranges. Most of all, the load may vary because of the aforementioned external parameters as well as the nature of the equipment the motor is required to operate. The problem then is to improve efficiency under all varying conditions of load, in real time, as well as under the various conditions of motor operation (e.g. start-up, steady-state, constant load, varying load and intermittent operation and shut-down).

Since motors present an inductive load, there will be a lag or phase delay between the applied AC voltage and the current in the stator winding. In some existing systems, the phase angle between the zero voltage crossing and the zero current crossing is measured to estimate the load conditions in real time and to adjust the Triac firing angle accordingly. Other systems measure the back EMF and use this parameter to improve efficiency of operation. Existing systems utilize manual adjustments, as well as microprocessors, to measure the above parameters and adjust the Triac firing times. Although these methods achieve improvement in efficiency over uncontrolled motors, none has the advantage of a real time continuous automated efficiency optimization of the present invention.

SUMMARY OF THE INVENTION

In accordance with the present invention, there is provided a method and apparatus for automatically adjusting the firing angle of a Triac controlled polyphase AC induction motor to improve efficiency over a wide range of variable loads.

The present invention includes a three-phase induction motor having two of the three stator windings each in series with a Triac and an inrush current sensing device and one phase of a three-phase power source. Each Triac is regulated or controlled by a microprocessor programmed to turn the Triac on and off for improved efficiency under varying conditions. The introduction of a digital control system (including the microprocessor), together with embedded software, allows for automatic improvement of the efficiency of operation under variations of load and power input.

The present invention uses an improved method of maintaining operation of the three-phase motor at a high level of efficiency by measuring parameters not previously considered. By measuring these parameters and using the information to set the turn-on delay of each Triac, an improved efficiency of operation results. A further advantage is that by measuring these different parameters, the system is continually tuned or adjusted to maintain optimum efficiency of the motor in real time through variations of motor load, input voltage, and other operating conditions.

The system of the present invention utilizes a saturable-core transformer in series with one of the motor stator windings and a Triac connected to one phase of the AC voltage source for each of two of the three stator windings of the three-phase AC motor. The output of each saturable-core transformer produces a narrow voltage spike corresponding to the inrush current into the corresponding stator windings following the turn-on of the associated Triac. A microprocessor responds to measurements of the voltage spike amplitude in each transformer for each half cycle and compares the amplitude of the measured voltage spike with prior measured amplitudes for that transformer. As the Triac turn-on delay increases for each half cycle, the voltage spike will be of a constant amplitude to the point of the zero crossing of the input current. As the delay increases further, the amplitude of the voltage spike increases, then decreases and increases again. The system of the present invention searches for a decrease in spike amplitude as a function of increasing Triac turn-on delay. The non-linearity of these parameters as a function of Triac turn-on delay time gives rise to the ability of automatic tuning of the system to operate in an area where the spike amplitude decrease in slope is of a magnitude which corresponds to optimum efficiency of motor operation.

In operation, when the microprocessor senses that the motor is operating at optimum efficiency, the time interval between the turn-on of the Triacs and the voltage spikes representing the inrush currents for the optimal efficiency conditions are measured for each phase and stored in memory. Once these time intervals are established, maintaining the time intervals constant or nearly so will assure optimally efficient operation as the load varies. These time intervals are inversely proportional to the load, thus as either time interval decreases (e.g. when the load increases), the variation will be sensed and the corresponding Triac turn-on delay will be reduced. By reducing the Triac turn-on delay, the time interval will increase regaining efficient operation. The control is maintained by a microprocessor with built-in memory. The memory stores the instruction for performing the measurements, comparing them to the prior data and adjusting the Triac firing delay. An external clock is utilized for timing measurements.

In addition, the control system of this invention provides for a shut-down under brown-out or low voltage conditions, as well as over voltage conditions and locked rotor conditions, thus minimizing possible damage to the motor.

Using the control system of this invention, a standard, unmodified, alternating current, three-phase motor will start with reduced input current and mechanical stress. It is protected from phase loss (single phasing), excessively high or low source voltage, or a locked rotor condition. The control system will further limit the input current to match the load of the motor. The output of a high frequency current transformer, placed in series with a load, is demodulated to produce a pulse which is proportional to the stator inrush current. This pulse is used by a microprocessor to determine an optimum firing angle for a full wave switch (such as a Triac or other solid state relay), which is placed in series with the load. Thus near-optimum motor operating efficiency is achieved during start up under rated loads and subsequent operation under less than maximum loads, and/ or more than minimum rated voltage. Further, the microprocessor uses the switch to de-energize stator windings under locked-rotor conditions that may occur during start up or normal running, or a voltage source anomaly, such as undervoltage, or missing phase which would cause start-up stalling, excessive run current, or stalling under rated loads. Additionally, in applications driving loads with high rotational momentum, such as large turbine pumps, when the AC power is interrupted, the motor, driven by the load will spin freely. During this time, the motor is generating power. If the source voltage is reapplied while the motor is running in this state, the result is a very high mechanical stress or catastrophic failure since the generated voltage is out of phase with the source voltage. The system of this invention measures the load current and will inhibit source voltage until the generated voltage is no longer present.

Three-phase alternating current (AC) induction motors are designed for optimum efficiency of operation when operating at maximum rated load at its minimum rated voltage. It becomes inefficient when operated at less than its maximum load and/or more than minimum rated voltage. Stator windings having full AC line power applied at all times irrespective of applied load results in copper and iron losses that are large even though the load may be small. This will result in unnecessary heat, a shortened motor life, and increased maintenance and operating costs.

One way of reducing the losses in the operation of a three-phase AC induction motor is to interrupt the AC power source for part of each voltage cycle. At less than full load or more than the minimum voltage, the motor will run at its normal speed if the power is applied for less than a half cycle due to rotational momentum. Commercially available devices used to interrupt the AC power include Triacs, SCR configurations, and other types of solid-state relays. These devices are connected in series with the stator windings and will be switched off when the AC power source is at zero volts and turned on at selected times during the associated voltage cycle.

The load on the motor is sensed and a signal produced which varies with the load. The load sensitive signal is used to determine the duty cycle for each voltage cycle. Under lightly loaded or free running conditions, one of the phases may not produce an inrush current pulse. In this case, the one phase of the stator is de-energized and the motor is allowed to operate on the two remaining phases. The delay from a voltage zero crossing to the Triac turn on time is expressed in degrees and referred to as the Triac firing angle. As the load on the motor increases, the microprocessor will turn on the de-energized stator winding and check for an inrush current pulse. If the inrush current pulse is present, the microprocessor will analyze the inrush current pulse to determine the optimum Triac firing angle. As the load on the motor is increased, the Triac firing angle is decreased, thus providing more current to the stator windings. Conversely, as the load decreases the Triac firing angle is increased, thus providing less current to the stator windings. The present invention relates to a method for automatically obtaining an optimum timing for the delay from Triac firing angle to the peak of the inrush current pulse. This timing is adjusted by changing the Triac firing angle, thus maintaining the current/ load efficiency for the motor under varying load and other operating conditions.

BRIEF DESCRIPTION OF THE DRAWINGS

Other aspects and advantages of the present invention will become apparent to those skilled in the art, having had the benefit of the following disclosure and the accompanying drawings.

DETAILED DESCRIPTION

One embodiment of the present invention comprises a control system for a three-phase AC induction motor. The control system having two full-wave switches, such as Triacs, and inrush current sensing devices, each in series between one phase of a three-phase AC power source and one of the three stator windings of an induction motor.

Figure 1:
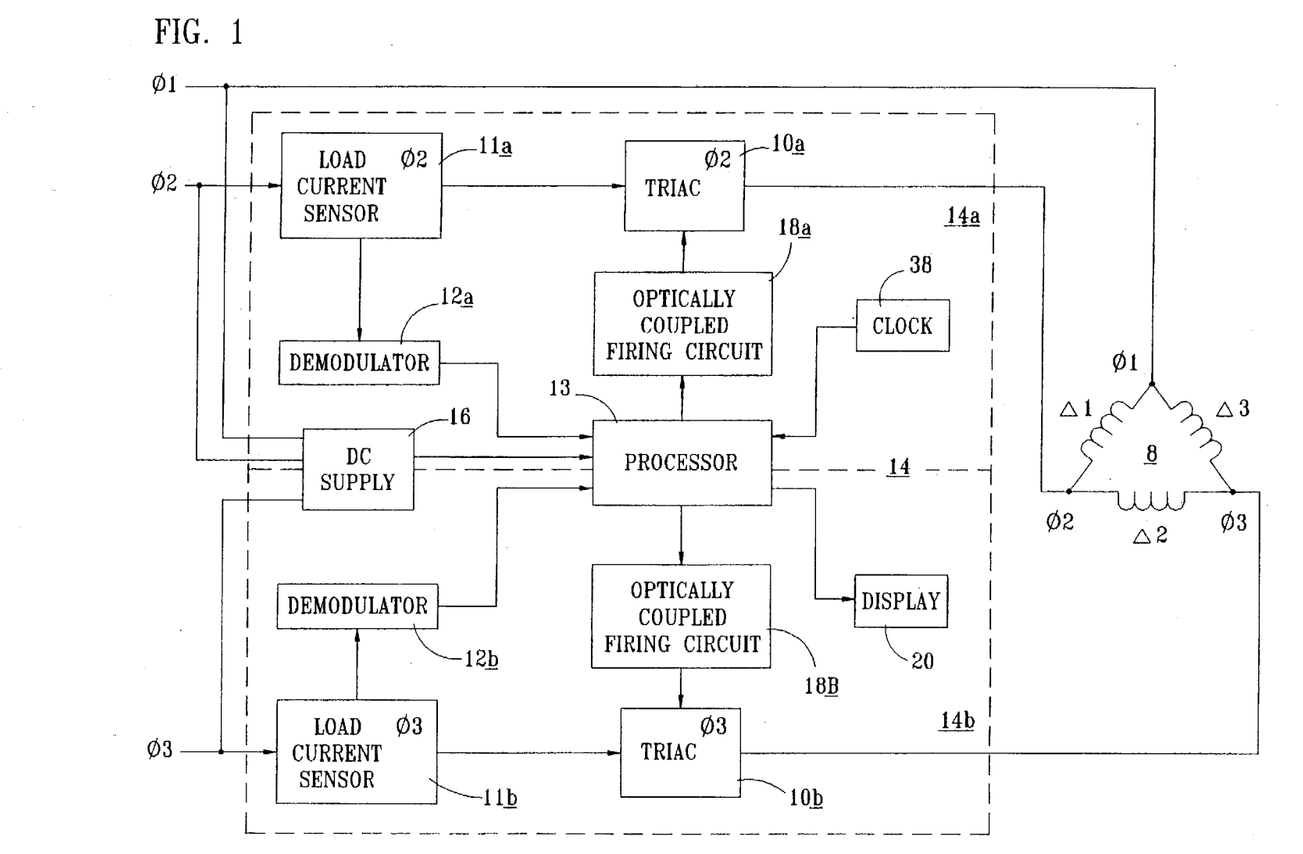
FIG. 1 is a block diagram of a control system in accordance with the present invention.

Referring now to FIG. 1, a three-phase AC induction motor 8 is shown connected, within control circuits 14a, 14b which comprise control system 14, in series with full-wave Triac switches 10a, 10b, respectively, to limit the voltage applied across two of the stator windings of the motor 8 and also to limit the current through the stator windings. Saturable-core transformers 11a, 11b (load current sensors) are also connected in series with the stator windings of the induction motor 8 between Triac switches 10a, 10b, respectively, and two phases of the three-phase AC power source, phase two φ2 and phase three φ3. The output of each of the saturable-core transformers 11a, 11b is a measure of the peak inrush current through the stator windings, Δ1Δ2 and Δ2Δ3, respectively.

When the AC voltage from the three-phase source φ1, φ2, φ3 is applied to the stator windings of the motor 8, while the full-wave Triac switches 10a, 10b, are turned on, a delayed current will flow in the stator windings due to the inductive reactance of the circuit. The actual delay is proportional to the resistance of each stator winding, the motor characteristics, and a load coupled to the motor 8. During the greatest rate of change of current as a function of time, which occurs during the leading edge of the inrush current, a voltage pulse or spike will be produced on the output of the saturable-core transformers 11a, 11b.

Figures 2, 3:
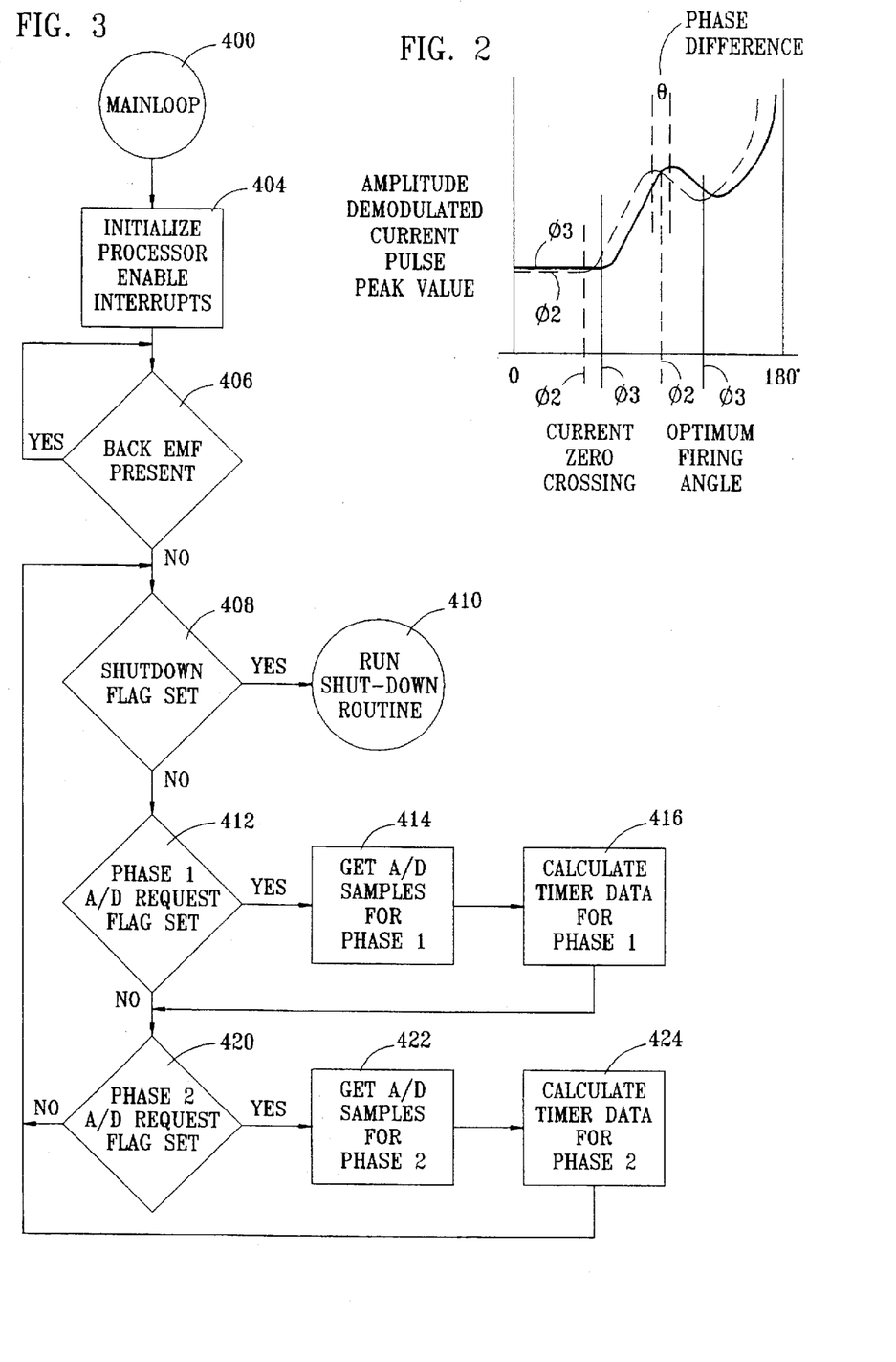
FIG. 2 is a plot of amplitude vs. firing angle, showing the negative slope of the peak amplitude demodulated inrush current pulse for each of φ2 and φ3 of a three-phase power source as a function of Triac firing angles.
FIG. 3 is a flowchart illustrating the operation of a microprocessor control sequence as part of the control system of FIG. 1.

After performing its initialization functions, the microprocessor 13 turns on Triacs 10a, 10b. Using the outputs from demodulators 12a, 12b, the microprocessor 13 performs a check to determine the presence of inrush current pulses in the control circuits 14a, 14b for phase two φ2 and phase three φ3 as controlled by Triacs 10a, 10b. If an inrush pulse is found on both phase two φ2 and phase three φ3, the phase difference θ detected between phase two φ2 and phase three φ3 inrush current pulses, as shown in FIG. 2, is stored in the microprocessor 13 memory.

If, however, an inrush pulse is found in only one phase, either phase two φ2 or phase φ2 in one of the circuits 14a, 14b then the Triac 10a or 10b associated with the circuit lacking a pulse remains turned on, and the motor 8 operates on only two phases, including phase one φ1.

Induction motor rotors are typically equipped with stator windings to enhance the initial start rotation of the motor and are designed to switch out of the starting mode automatically. In accordance with the present invention, motor 8 is monitored as it goes through its "starting mode" to modify control functions following the start mode. The control circuits 14a, 14b of the control system 14 respond to the large voltage pulses that are present during the starting mode, representing the inrush current at the output of the saturable-core transformers, 11a, 11b. When the starting mode ends, as it is normally designed to do automatically, the voltage pulses decrease below a limiting voltage level and the control system 14 senses that the motor 8 has entered its operating mode. If the "starting mode" fails to automatically end after a preprogrammed length of time, usually a few seconds, but variable for different motors, the control system 14 will assume a locked rotor condition exists and will shut down the motor 8 requiring a manual restart.

Assuming that the motor 8 is past its starting mode, on a subsequent voltage cycle, the Triacs 10a, 10b will be turned on after an arbitrary delay of approximately 400 μsec. This is a time interval between a line voltage zero crossing for each of two phases of the power source and the turn-on of the Triacs 10a, 10b. At a later time within the voltage cycle of each phase, depending on the characteristics of the circuit, a current flows to produce a voltage spike or pulse at the output of each of the saturable-core transformers 11a, 11b. The control system 14 then advances to what is referred to as the "capture mode". On a subsequent half cycle of the input voltage, the microprocessor 13 controls the turn on of the Triacs 10a, 10b to be delayed by an additional 25 microseconds, and the voltage pulse from each (saturable-core)-transformer 11a, 11b representing the inrush current in each circuit 14a, 14b is again measured. The amplitudes of the last pulses from each of the transformers 11a, 11b are compared with the previously generated pulses. When the amplitude of the last pulse for each circuit 14a, 14b starts increasing, indicating that the stator and rotor currents for each measured phase of the motor 8 are close to equal and motor efficiency as nearing its optimum, the microprocessor 13 transfers from the "capture mode" and initiates a "tune mode." On subsequent half cycles of the input voltage, the turn-on delay of the Triacs 10a, 10b is increased in 1 μsec. increments, and the amplitude of the resulting pulse from the transformers 11a, 11b representing the inrush current will again be measured for each circuit 14a, 14b.

Referring again to FIG. 2, the amplitude of inrush current pulses for each phase will peak at some value as additional delays are introduced, but will subsequently decrease if still additional delays are introduced and eventually resume increasing as yet additional delays are introduced. The optimum operation of the motor 8 is realized at a point on the downslopes of a each plot of the output of the demodulators 12a, 12b (pulse amplitude) versus Triac 10a, 10b firing angle as illustrated in FIG. 2.

The microprocessor 13 is programmed to sense a reversal in slope, from increasing amplitude pulses to decreasing amplitude pulses, and will stop the addition of delay increments to the time interval between a zero voltage crossing and the turn on of Triacs 10a or 10b. The control system 14 continues to respond to the time intervals between the turn-on of Triacs 10a, 10b and the zero crossing of the voltage pulse representing the inrush current on each phase two φ2 and phase three φ3 circuit. These time intervals, as well as the phase difference between phase two φ2 and phase three φ3, are stored in the memory of the microprocessor 13 and the control system 14 now shifts to an operating mode to maintain the time intervals thus established. This operating mode interval will be unique for a given motor under selected operating conditions.

As the load increases and more current is required, the control system 14 attempts to maintain the time intervals by turning the Triacs 10a, 10b on earlier, as measured from the zero voltage crossings for each circuit 14a, 14b. As the load decreases and less current is required, control system 14 will maintain the stored time interval by turning the Triacs 10a, 10b on later as measured from the zero voltage crossing.

If the rate of change of load or required current is too fast for the control system 14, then the microprocessor 13 causes an error flag to be generated and the control system 14 initiates a "re-start mode". Capture, tune and operating modes are repeated. The control system 14 will thus automatically seek and locate the optimally efficient point of operation and then maintain such operation as changes in load or input voltages occur.

The advantages of the system are the reduced power consumption and the resultant reduced operating temperatures of the motor 8, resulting in further incremental improvements in efficiency or, conversely, in the ability to obtain greater power output from smaller motors.

The control of FIG. 1 circuit is further described as follows. The outputs of saturable-core transformers 11a, 11b are demodulated and rectified by demodulators 12a, 12b respectively, and results in voltage pulses proportional to the inrush currents through the stator windings Δ1Δ2, Δ2Δ3, of the motor 8. The microprocessor 13, controlled by a clock 38 and responsive to the outputs of the demodulators 12a, 12b is programmed to respond to the amplitude of the voltage pulses representing the inrush currents as a function of the time interval between the zero voltage crossings of each half cycle of the input line voltages from the three-phase source and the Triac turn-on times. The characteristics of the control system are such that when the ratio of the demodulated pulse amplitudes are plotted against the firing angle of each Triac 10a, 10b curves containing intermediate peaks 21, 21' and null points 24, 24' occur, as shown in FIG. 2. The downslopes 22, 22' approaching the null points 24, 24' represent the optimum firing angles for Triacs 10a, 10b as a function of AC induction motor load, at which point the applied stator currents and induced rotor currents in motor 8 are substantially matched. It is important to note that the control system 14 in searching for the optimum delay in turning on Triacs 10a, 10b varies the delay from increments in the order of 25 μsec. to increments of only 1 μsec. as the point of optimum operation is approached.

The control system of this invention makes use of the anomaly in the ratio of modulated current amplitude and Triac firing angle for each control circuit 14a, 14b to automatically locate and select the null point 24, 24' for each circuit and maintain the firing angle along the downslopes 22, 22' of each curve as it approaches the null point 24 24'.

Also included as part of the control system 14 is a DC power supply 16 connected to the three-phase voltage source. The power supply 16 provides DC voltage for the microprocessor 13. In addition, the microprocessor 13 is connected to a status display 20 for providing a visual presentation of the operation of the control system 14. To control the firing angle of each Triac 10a, 10b, as well as to isolate Triac 10a, 10b from the DC voltages of microprocessor 13, an optically coupled firing circuit 18a, 18b responds to an output of the microprocessor 13 and provides the control signals to turn Triacs 10a, 10b on or off.

Referring now to FIGS. 3–12, the operation of the microprocessor 13 to control the turn on of the Triacs 10a, 10b is illustrated by way of flow charts. With reference to FIG. 3, the microprocessor 13 is reset at step 400 to start the process of controlling the optimum operation of the three-phase induction motor 8. After resetting the microprocessor 13, a processor initializing routine 404 is run to place the microprocessor 13 in condition for generating control pulses to the firing circuits 18a, 18b. After initializing the microprocessor 13, a back EMF check is made during inquiry step 406 to determine if a loss of power on the motor 8 has permitted the momentum of the load to drive the motor as a generator. If the source voltage is re-applied while the system is in this state, a high mechanical stress or possible catastrophic failure might occur because the motor 8 generated voltage and the source voltage would be out of phase. A back EMF causes the microprocessor 13 to recycle back to re-perform the inquiry 406 check. This continues until inquiry 406 indicates there is no back EMF on the system and the operation advances the microprocessor 13 to shutdown flag set inquiry 408. If the shutdown flag is set, the microprocessor 13 initiates and runs shutdown routine 410. Routine 410 checks an error handler 401 routine (not shown) to determine what condition caused flag to be set. Some error conditions, such as a locked rotor, causes the microprocessor 13 to turn off the Triacs 10a, 10b to disconnect the load and requiring a manual restart. Other error conditions, such as low voltage conditions, will recycle the microprocessor 13 until the condition clears and then automatically resets the control system 14.

If flag inquiry 408 is not set, the microprocessor 13 advances to the analog-to-digital (A/D) sample request routine 411.

Referring now to FIGS. 4 through 12, the interrupt handler 404 initializes the preset conditions for sequencing the control system 14 to perform the various steps of checking for zero voltage processing, an inrush pulse, and adjusting the firing angles of the Triacs 10a, 10b to permit optimum operation of motor 8.

Figure 4:
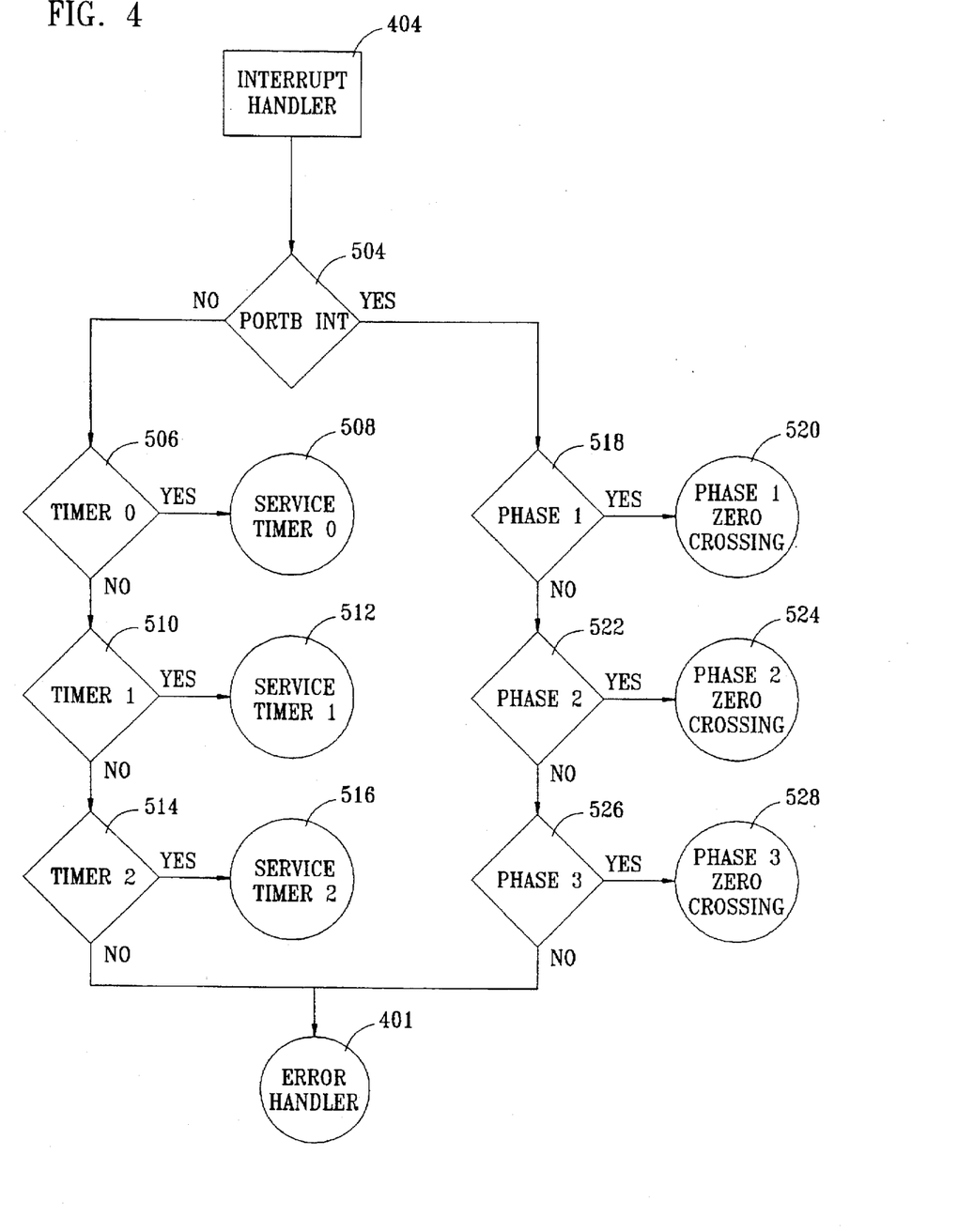
FIG. 4 is a flowchart illustrating an interrupt handler providing timer and phase sequences for the control sequence of FIG. 3.

Referring to FIG. 4, microprocessor 13 checks the portB inquiry 504. The portB flag is initially in a clear condition (not set) causing the system to check the timer 0 inquiry 506 and set the portB flag. Initialization of the circuits has set the flag of inquiry 506 so that the first query of the timer 0 inquiry 506 will cause the microprocessor 13 to initiate the service timer 0 routine 508.

Figure 5:
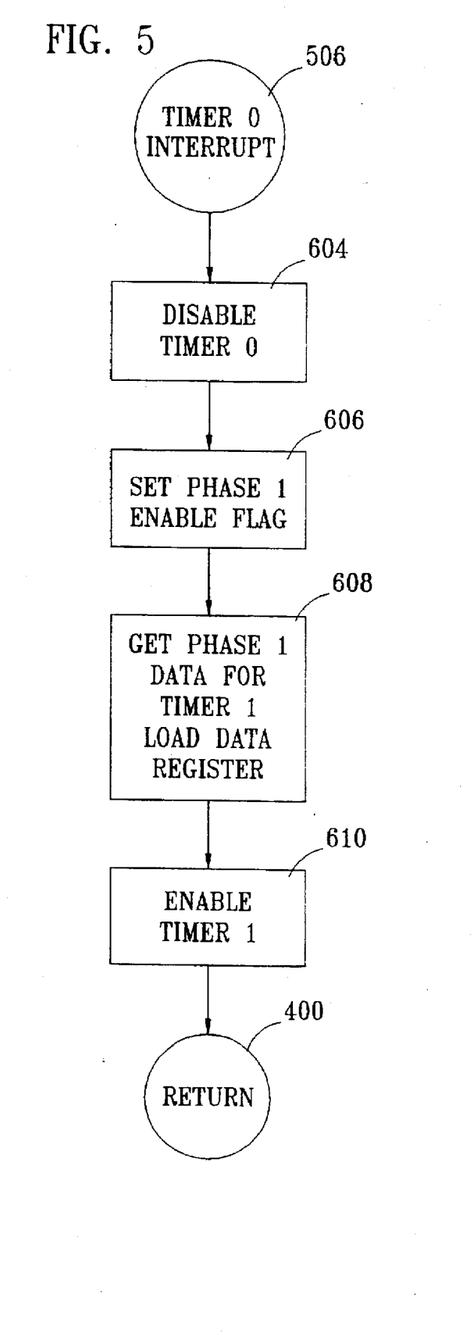
FIGS. 5, 6, and 7 are flowcharts illustrating details of the Timer 0, Timer 1, and Timer 2 routines respectively, of FIG. 4.

Referring now to FIG. 5, the service timer 0 routine 508 sequence begins by disabling timer 0 at routine 604, initiating the steps to routine 606 to set the phase 2 enable flag. The service timer 0 routine then steps to routine 608 to obtain phase 2 data for timer 1 and loads the data into a data register. Next, the microprocessor 13 steps to routine 610 to enable timer 1 and returns to the processor main loop routine 400 (FIG. 3). The microprocessor 13 again cycles to inquiry 504 (FIG. 4) which is now in a set condition and advances to phase 2 inquiry 518 after the portB is cleared.

Figure 8:
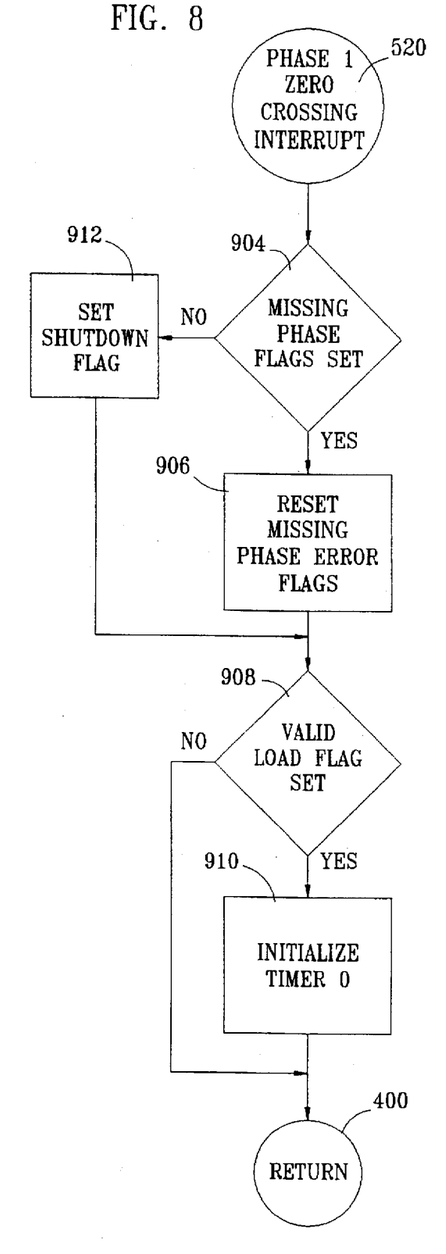
FIGS. 8, 9, and 10 are flow charts illustrating details of the φ2, φ3, and φ1 zero crossing routines, respectively, of FIG. 4.

Referring now to FIG. 8, the phase 2 zero crossing routine 520 initially checks for missing phase flags during the inquiry 904. If the inquiry 904 flag is not set, the system sets the shutdown flag in routine 912 and then advances to the valid load flag set inquiry 908. If, however, the inquiry 904 flag is set the microprocessor 13 initiates reset missing phase error flags routine 906. If inquiry 908 flag is set, then the microprocessor 13 initiates an initialize timer 0 routine 910 and returns to the microprocessor 13 to the main loop routine 400. If inquiry 908 flag is clear, the microprocessor 13 steps directly to the main loop routine 400.

Returning to FIG. 4, the microprocessor 13 again checks inquiry 504, whose flag was cleared in the last check, and steps to inquiry 506 whose flag was cleared during the last query, and then steps to check timer 1 inquiry 510. As inquiry 510 was initialized to a flag set condition, the microprocessor 13 now initiates the service timer 1 routine 512.

Figure 6:
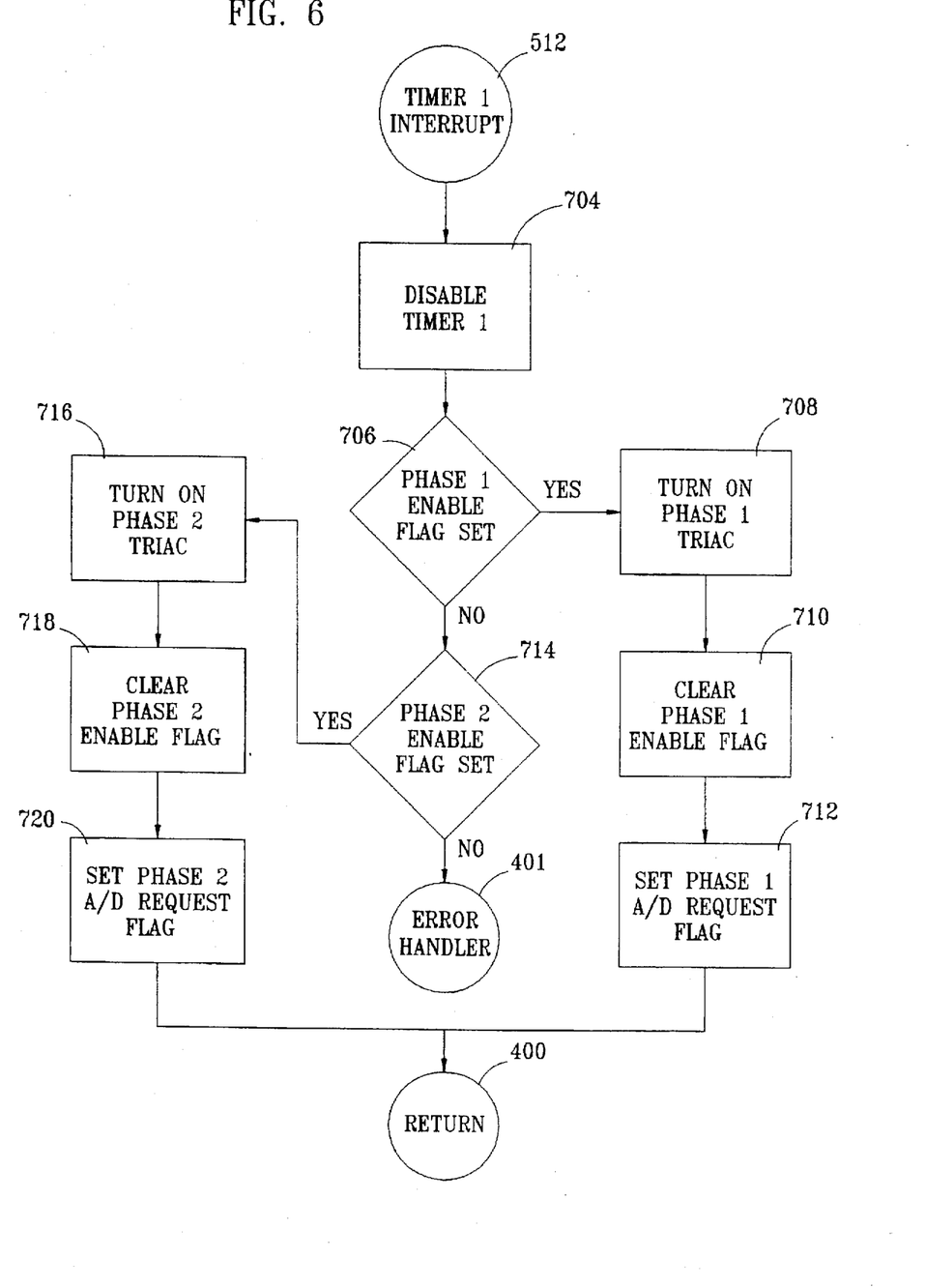

Referring now to FIG. 6, the service timer 1 routine 512 runs the disable timer 1 routine 704 and then checks inquiry 706 to ascertain if the phase 2 enable flag is set. If the flag is set, the microprocessor 13 initiates phase 2 Triac turn-on routine 708 and then a clear phase 2 enable flag routine 710. Following the flag routine 710, a set phase 2 A/D request flag routine 712 is run and the operation returns to the main loop routine 400.

If the phase 2 enable flag is not set at the inquiry 706, the microprocessor 13 then checks the phase 3 enable flag inquiry 714 for a set condition. If it is set, microprocessor 13 initiates phase 3 Triac turn-on routine 716 and then a clear phase 3 enable flag routine 718 followed by a set phase 3 A/D request flag routine 720. The loop then returns to the main loop 400. If neither inquiry 706 or inquiry 714 flags are set, the microprocessor 13 steps to an error handler routine 401, to check if any of the conditions exist that would cause the shut-down flag to be set for either shutting down for a manual restart or shutting down with an automatic restart.

The microprocessor 13 again cycles to inquiry 504 (FIG. 4) where the flag is set to make a check of inquiry 518 and clear the inquiry 504 flag. The inquiry 518 flag being clear, the microprocessor 13 checks inquiry 522 where the flag was set at initialization and this results in initiating a phase 3 zero crossing routine 524.

Figure 9:
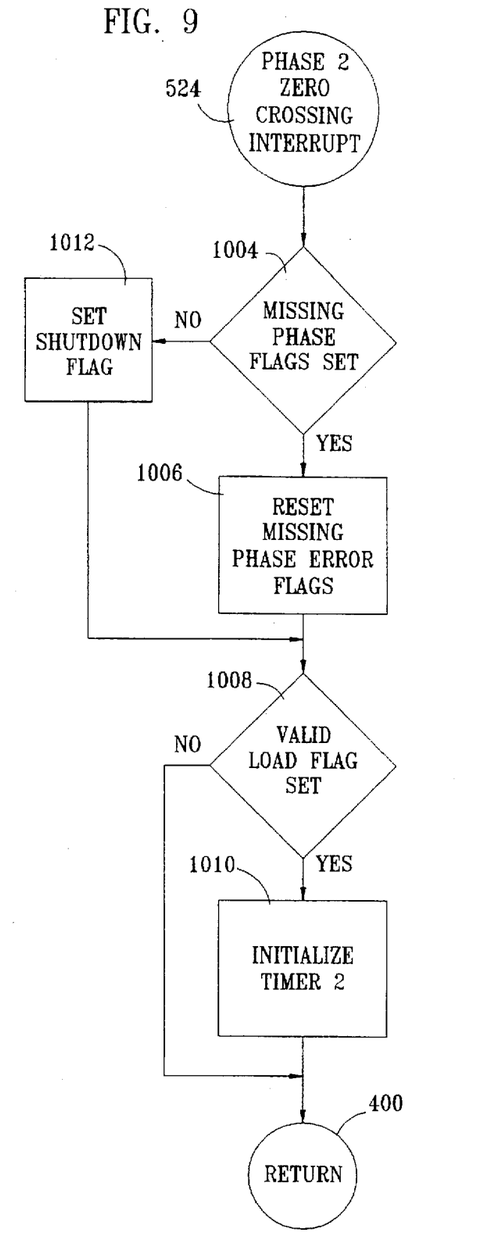

Referring now to FIG. 9, the phase 3 zero crossing routine 524 checks a missing phase flag inquiry 1004. If the inquiry 1004 flag is not set, the system sets the shutdown flag in routine 1012 and steps to the valid load flag set inquiry 1008. If, however, the inquiry 1004 flag is set the microprocessor 13 initiates a reset missing phase error flags routine 1006. If the flag is set at the inquiry 1008, the microprocessor 13 initiates an initialize timer 2 routine 1010 and returns to the main loop routine 400. If the flag at the inquiry 1010 is clear, the microprocessor 13 steps directly to the main loop routine 400.

The microprocessor 13 again checks inquiry 504 (FIG. 4), resetting the flag which was cleared in the last check and then steps to inquiry 506 and then to inquiry 510, both flags having been cleared during the previous queries. Next, the microprocessor 13 steps to check timer 2 inquiry 514. As the inquiry 514 flag was initialized to a set condition, the microprocessor 13 now initiates the service timer 2 routine 516.

Figure 7:
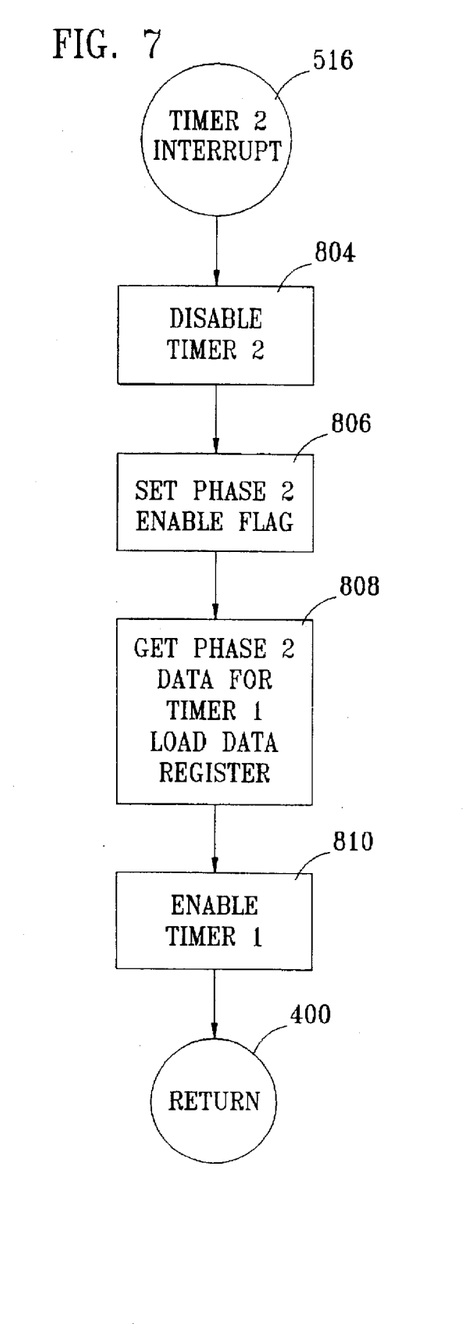

Referring now to FIG. 7, the service timer 2 routine 516 sequence begins by disabling timer 2 at routine 804 then steps to routine 806 to set the phase 3 enable flag. Following the routine 806, the operation steps to routine 808 to fetch phase 3 data for timer 1 and loads the phase 3 data into a data register. Next, the microprocessor 13 steps to routine 810 to enable timer 1 and return to the main loop routine 400.

The microprocessor 13 again cycles to inquiry 504 (FIG. 4), to identify that the portB flag is in a set condition and advances to phase 2 inquiry 518 and phase 3 inquiry 522 both of which have their flags cleared during a previous sequence. Next, the microprocessor 13 checks inquiry 526 having a flag set during initialization and then steps to phase 1 zero crossing routine 528.

Figures 10, 11:
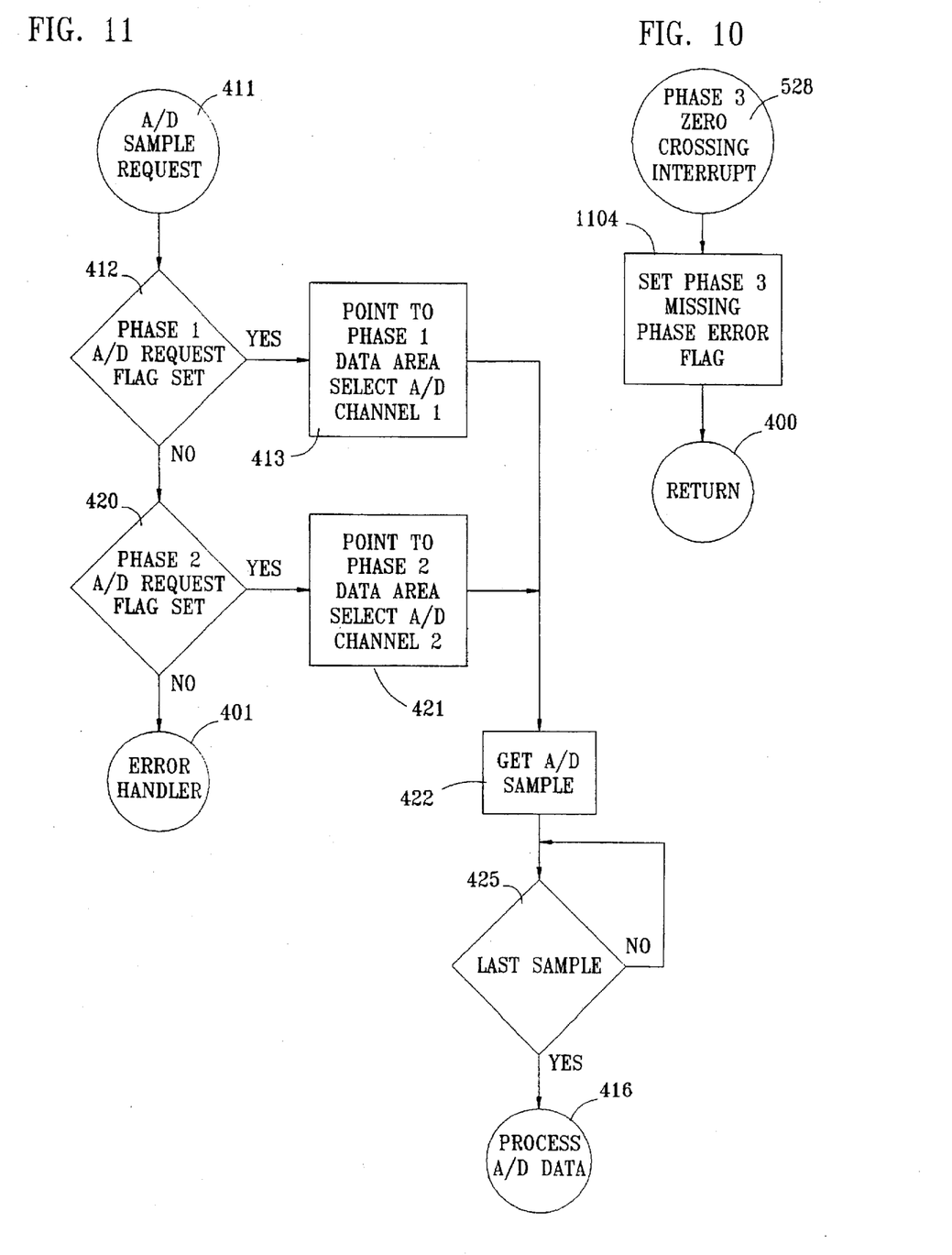
FIG. 11 is a flow chart illustrating in greater detail the data sample acquisition sequence of FIG. 3.

Referring now to FIG. 10, phase 1 zero crossing routine 528 sets a phase 1 missing phase error flag at routine 1104 and returns to the main loop routine 400.

Referring again to FIG. 3 and also to FIG. 11, the A/D sample request routine 411 will be described. When checking the inquiry 412 shows that the flag is set, as has been previously described, thereby initiating a routine 413 (FIG. 11) to select the phase 2 A/D data channel to deliver an A/D sample. The routine 422 is then initiated to obtain the A/D sample for phase 2 and check inquiry 425 for a last sample condition. If the inquiry 425 flag is set, the microprocessor 13 sequences to the process A/D data routine 416. The checking inquiry 412 clears the flag so that on a subsequent A/D request flag inquiry 420 to initiate the corresponding phase 3 A/D data channel select routine 421 again initiates A/D data acquisition routine 422 to obtain the sample and sequence through inquiry 425 until the last sample flag is set to sequence the process A/D data routine 416.

Figure 12:
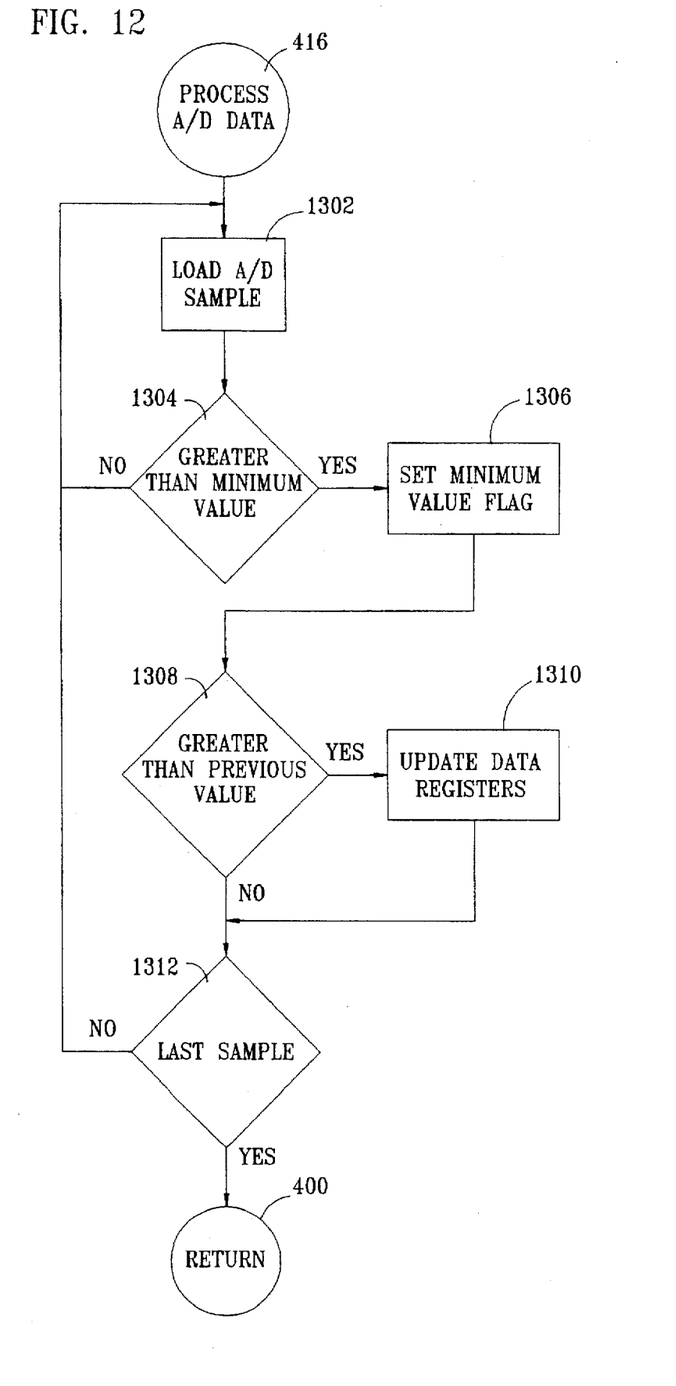
FIG. 12 is a flow chart illustrating in greater detail the data sample processing sequence of FIG. 11.

Referring now to FIG. 12, routine 416 initiates a load A/D sample routine 1302 and then checks inquiry 1304 to ascertain if the sample is greater than a defined minimum value. If the sample is less than the minimum, the microprocessor 13 recycles to obtain another sample until the inquiry 1304 flag is set, indicating the sample is greater than the defined minimum value at which time routine 1306 resets the inquiry 1304 flag and checks inquiry 1308 to compare the new sample with the previous sample. If the new sample is greater than the previous sample, routine 1310 updates the data registers. If the new sample is not greater, inquiry 1312 is checked to ascertain if a last sample condition exists and if not, recycles to load a new data sample at routine 1302. If the last sample inquiry 1312 flag is set, the processor 13 resets to main loop 400.

Referring once again to FIG. 1, timing for the microprocessor 13 is obtained by clock 38 having a frequency supplied by an external crystal (not shown). Also, the status of the microprocessor 13 is indicated by a display 20.

Again, Triacs 10a, 10b are isolated from the microprocessor 13 by the use of optically coupled firing circuits 18a, 18b, respectively, and the control system power is powered by a DC power supply 16 (not described) connected to the three-phase source voltage.

Whereas the present invention has been described in relation to the drawings attached hereto, it should be understood that other and further modifications, apart from those shown or suggested herein, may be made within the spirit and scope of this invention.

We claim:

1. Apparatus for controlling the operation of a polyphase AC induction motor comprising:

means for switching between a turn on state and a turn off state a first and a second phase of a polyphase AC voltage source to selectively connect the induction motor to each of said first and second phases;

at least a first and a second means for sensing the amplitude of inrush current for the first phase and second phase to the induction motor following a voltage zero crossing of each of said first and second phases connected to the induction motor;

a controller sensing an increase of the amplitude of inrush current for the first phase and the second phase as a function of increasing time delay between a voltage zero crossing and the turn on of said switching means, and further for sensing a decrease in the amplitude of the inrush current as a function of increasing time delay between a voltage zero crossing and the turn on of said switching means following a peak in the inrush current amplitude for the first phase and the second phase, said controller deriving the time intervals between the turn on of said switching means and the time of sensing of said inrush currents to generate a first and a second control signal; and means responsive to the first and second control signals for incrementally controlling the turn on of said switching means for each successive half cycle of the first phase and second phase applied to the induction motor following said voltage zero crossings.

2. Apparatus for controlling the operation of a polyphase AC induction motor as set forth in claim 1 wherein said means for sensing comprises a first and second saturable core transformer each connected in series with a first and second stator winding of the AC induction motor, respectively.

3. Apparatus for controlling the operation of an AC induction motor as set forth in claim 2 wherein said means for sensing further includes a first and second demodulator responsive to the output of each of the first and second saturable-core transformers, respectively, and providing a demodulated value of a first inrush current and a second inrush current to said controller.

4. Apparatus for controlling the operation of an AC induction motor as set forth in claim 1 wherein said switching means comprises a first Triac connected in series with a first stator winding and a second Triac connected in series with a second stator winding of the AC induction motor.

5. Apparatus for controlling the operation of a polyphase AC induction motor comprising:

a first and a second semiconductor switches for switching between a turn on state and a turn off state of a first and a second phase, respectively, of a polyphase AC voltage source to selectively connect the induction motor to each of said first and second phases;

a first and a second saturable-core transformers responsive to the amplitude of a first inrush current and a second inrush current for said first and second phases, respectively, switched to the induction motor resulting from the application of each of said first and second phases to the induction motor;

a controller sensing an increase in the amplitudes of the first and second inrush currents as a function of increasing time delay between a voltage zero crossing of the AC voltage source and the turn on of said first and second semiconductor switches, and for sensing a decrease in the amplitude of the inrush currents as a function of increasing time delay between a voltage zero crossing and the turn on of each of the semiconductor switches following a peak in inrush current amplitude, said controller deriving the time interval between the turn on of each of the semiconductor switches and the time of sensing of the first and second inrush currents and generating in response thereto a first and second control signal; and means for controlling said first and second semiconductor switches between the turn on state and the turn off state for each switch in response to the first and second generated control signal to incrementally vary the turn on of each of the first and second semiconductor switches in successive half cycles of the applied first and second phases of the AC voltage source.

6. Apparatus for controlling the operation of an AC induction motor as set forth in claim 5 wherein said first and second semiconductor switches each comprise a Triac.

7. A method for controlling the operation of a three-phase AC induction motor having first, second, and third stator windings and a rotor, comprising the steps of:

sensing first and second inrush currents to the first and second stator windings of the induction motor resulting from the turning on of first and second two-state switches connected to a first phase and a second phase of a three-phase AC voltage source;

capturing the amplitude of the highest value of said first and second inrush currents following a first and a second voltage zero crossings, respectively, for each of said first and second phases of the AC voltage source applied to the induction motor;

determining a timing reference from said first and second phase voltage zero crossings and identifying the time delay between each voltage zero crossing and the capturing of the amplitude of the highest value corresponding to each of said first and second inrush currents;

tracking the value of each of said first and second inrush currents following a corresponding first and second voltage zero crossing for a first and second time delay from the associated voltage zero crossing greater than the time delay for capturing the amplitude of the highest value of each of the first and second current pulses; and controlling the turning on and off of the first and second two-state switches to maintain the first and second inrush currents at values for each less than the associated captured highest values for time delays from voltage zero crossings greater than time delay identified with the highest values of each of the first and second inrush currents.

8. The method for controlling the operation of a three-phase AC induction motor as set forth in claim 7 including the step of determining from the presence of each of said first and second inrush currents the inductive characteristics of the induction motor prior to capturing the amplitude of the highest value of each of said first and second inrush current pulses.

9. The method for controlling the operation of a three-phase AC induction motor as set forth in claim 7 including the step of incrementally delaying the turn on of said first and second two-state switches in each successive half cycle of the AC voltage following capturing the amplitude of the highest value of the inrush currents associated with each switch.

10. The method for controlling the operation of a three-phase AC induction motor as set forth in claim 7 including the step of determining the amplitude of the value of said first and second inrush current pulses following a preset increment from an associated voltage zero crossing for each pulse.

11. The method for controlling the operation of a three-phase AC induction motor as set forth in claim 10 including the step of increasing the incremental delay between a voltage zero crossing and the measuring of the amplitude of the associated inrush current pulse for each of said first and second inrush current pulses.

12. The method for controlling the operation of a three-phase AC induction motor as set forth in claim 11 wherein the initial incremental delay between a voltage zero crossing and a measurement of the value of the associated inrush current for each of said first and second inrush current pulse is set at 150 microseconds and subsequent increments are increased by 25 microseconds until the highest value of the inrush current pulse has been captured.

* * * * *